US008369217B2

(12) United States Patent
Bostica et al.

(10) Patent No.: US 8,369,217 B2
(45) Date of Patent: Feb. 5, 2013

(54) QUALITY OF SERVICE MONITORING ARCHITECTURE, RELATED METHOD, NETWORK AND COMPUTER PROGRAM PRODUCT

(75) Inventors: Paolo Bostica, Turin (IT); Simone Bizzarri, Turin (IT); Michele Vitale, Turin (IT)

(73) Assignee: Telecom Italia S.p.A., Milan (IT)

( * ) Notice: Subject to any disclaimer, the term of this patent is extended or adjusted under 35 U.S.C. 154(b) by 554 days.

(21) Appl. No.: 10/579,293

(22) PCT Filed: Nov. 17, 2003

(86) PCT No.: PCT/IT03/00743
§ 371 (c)(1),
(2), (4) Date: May 15, 2006

(87) PCT Pub. No.: WO2005/048629
PCT Pub. Date: May 26, 2005

(65) Prior Publication Data
US 2007/0041330 A1    Feb. 22, 2007

(51) Int. Cl.
H04L 1/00 (2006.01)
H04L 12/26 (2006.01)
H04J 1/16 (2006.01)
H04J 3/14 (2006.01)
(52) U.S. Cl. ...... 370/232; 370/229; 370/235; 370/230.1
(58) Field of Classification Search .................. 709/223, 709/224, 225, 226; 370/252, 229, 230, 230.1, 370/231, 232, 233, 234, 235, 235.1, 236, 370/236.1, 236.2, 237, 238, 238.1, 239, 240, 370/464, 471, 431, 461, 310, 313, 328, 329, 370/347, 349
See application file for complete search history.

(56) References Cited

U.S. PATENT DOCUMENTS
6,434,364 B1    8/2002  O'Riordain
(Continued)

FOREIGN PATENT DOCUMENTS
EP    1 304 831 A2    4/2003
WO   WO 99/12228     3/1999
(Continued)

OTHER PUBLICATIONS
Bellifemine, JADE: Java Agent Development Framework, Apr. 7, 2001, ETAPS 2001, all pages.*
Korhonen, EP 1 304 831 A2, Apr. 23, 2003, European Patent Office, all pages.*
(Continued)

*Primary Examiner* — Kwang B Yao
*Assistant Examiner* — Adam Duda
(74) *Attorney, Agent, or Firm* — Finnegan, Henderson, Farabow, Garrett & Dunner, L.L.P.

(57) ABSTRACT

An architecture for monitoring quality of service in a telecommunication network having a set of terminals provides for the terminals of the set of terminals to house measuring agents able to be configured to interlace with processes selected among processes for managing the application sessions of the network and processes for measuring the operating conditions of the network itself. Also provided is a management and configuration sub-system having a module for scheduling quality of service measurement campaigns capable of involving respective sub-sets of terminals according to a set of characteristics identifying the measurement campaign. The scheduling module is capable of configuring, for the purposes of the execution of the measurement campaigns, the measuring agents housed by the terminals included in the related subsets according to the set of identifying characteristics. An additional sub-system for managing the collection of the measurement data has a database for storing the measurement data and a processing center for processing the data.

34 Claims, 2 Drawing Sheets

U.S. PATENT DOCUMENTS

| | | | |
|---|---|---|---|
| 6,449,464 | B1 | 9/2002 | Ramesh |
| 6,795,406 | B2 | 9/2004 | Kikinis |
| 6,807,515 | B2 | 10/2004 | Vogel et al. |
| 2001/0001268 | A1* | 5/2001 | Menon et al. ................ 370/329 |
| 2001/0041566 | A1 | 11/2001 | Xanthos et al. |
| 2002/0077786 | A1 | 6/2002 | Vogel et al. |
| 2002/0141446 | A1 | 10/2002 | Koga |
| 2002/0181394 | A1 | 12/2002 | Partain et al. |
| 2003/0112766 | A1 | 6/2003 | Riedel et al. |

FOREIGN PATENT DOCUMENTS

| | | |
|---|---|---|
| WO | WO 01/19114 A1 | 3/2001 |
| WO | WO 01/72058 A2 | 9/2001 |

OTHER PUBLICATIONS

G. Caire et al; "A Communication Protocol for Agents on Handheld Devices", AAMAS 2002, Jul. 15-16, 2002, Bologna, Italy, 8 pages (2002).

3GPP TS 23.207 V6.6.0 (Sep. 2005) Technical Specification, "3rd Generation Partnership Project; Technical Specification Group Services and System Aspects; End-to end Quality of Service (QoS) Concept and Architecture" (Release 6), pp. 1-53, (2005).

3GPP TS 23.107 V6.4.0 (Mar. 2006) Technical Specification, "3rd Generation Partnership Project; Technical Specification Group Services and System Aspects; Quality of Service (QoS) Concept and Architecture" (Release 6), pp. 1-40, (2006).

* cited by examiner

Fig_1

Fig_2

QUALITY OF SERVICE MONITORING ARCHITECTURE, RELATED METHOD, NETWORK AND COMPUTER PROGRAM PRODUCT

CROSS REFERENCE TO RELATED APPLICATION

This application is a national phase application based on PCT/IT2003/000743, filed Nov. 17, 2003, the content of which is incorporated herein by reference.

FIELD OF THE INVENTION

The present invention relates to techniques for monitoring Quality of Services (QoS) in telecommunication networks. The invention was developed with particular attention to its possible application to mobile communication network. However, reference to this particular field of possible application must not be construed as limiting the scope of the invention.

DESCRIPTION OF THE PRIOR ART

With the emergence and development of mobile networks, from GSM to GPRS and, more recently, to UMTS, the variety and the number of voice, data, multimedia services available or emerging in this field is growing both in terms of functional characteristics, and in regard to performance requirements, to meet needs expressed by the user or deriving from an ever more competitive market.

For a provider of mobile services, being able to obtain a qualitative benchmark on its services is increasingly becoming a factor for success and market penetration, as well as for containing "churn" phenomena, with important repercussions on revenues.

The fundamental needs of the service provider, to achieve qualitative benchmarking, are essentially linked to the ability to:
objectively evaluate and manage Quality of Service (QoS) in a manner that is as close as possible to subjective perception,
measure QoS in systematic fashion, focused on the sources of critical situations or degradation, and
evaluating QoS levels in a manner that is comparable with other operators.

All this with the additional requirement of being able to perform the measurements at low cost. The service provider must therefore have available QoS and performance data that are:
systematic, with accurate and reliable data, in order to monitor the offered quality levels (referred to application sessions),
punctual, to highlight quality degradation (which can be associated to the user and to the involved communication, and related cause and location information), able to facilitate and drive troubleshooting and improvement activities, and to make them more timely and effective,
specific, with data capable of being used not only for planning purposes, but also for a real time optimisation of the configuration and management of network resources (radio access and core) and for comparison with other operators to face the competition.

For a user of mobile services, being able to achieve high quality levels during a communication, having objective documentation of the quality and operational levels in relation to the underwritten agreements (SLA), is not just a requirement, but is a guarantee of transparency and an image factor of the service provider which increases his/her satisfaction and hence his/her loyalty to the service provider.

The complexity and heterogeneity of the mobile radio network environment (limited capacity of radio resources, mobility, integration with fixed networks, limited dimensions of the screen and keyboard of the terminal, etc.) and of the services offered therein (e.g. localisation, MMS, video streaming, multimedia) make it difficult to obtain an accurate and punctual measurement of the dynamically variable quality levels experienced during a communication. This is also true because, in addition to being referred to reference agreement underwritten with the user, said quality levels depend on an ever more complex management based on differentiated service and traffic classes (conversational, streaming, interactive, background see for instance 3GPP TS 23.107) with dynamic control and differentiated and sophisticated stream management (3GPP TS 23.207), in terms of guaranteed quality (requested) and of priority (RSVP, DiffServ, etc.).

An objective, systematic and punctual evaluation of the quality of service provided, adhering as closely as possible to the quality perceived by the user and which can be used not just by the service provider/operator, but also by the user him/herself, increasingly leads to decentralise the measuring and performance monitoring points in the points of access at the ends of the link (user terminal and application servers) and in the user-terminal application interaction (application level or highest possible protocol layer).

Heretofore, the methodologies and techniques in use have fundamentally been based:
on QoS measurement and management techniques based on terminal and network measurements which are typical of the quality and operating conditions of radio access, used also for the optimised management of handovers and of radio resources, such as measurements of transmitted or received power, BER, spectrum, interference on uplink and downlink channels, often, though erroneously, called QoS measurements (see for example WO-A-01/19114 and U.S. Pat. No. 6,449,464). These measurements indirectly increase the offered quality level, but are not capable of directly evaluating it in the quantitative and qualitative sense in relation to the quality perceived by the user;
on monitoring, under actual traffic conditions, the performance of shared network and link resources at the transport level (normally carried out by the mobile radio operator with internal or external measures, taken by sampling or total with counter, but almost never inclusive of the terminal and hence not end-to-end and not at application level), with evident limits to the ability to correlate said measures to the communication quality actually perceived by the user, also deriving from the difficulty of activating co-ordinated measuring campaigns in the network on a call and/or service session basis;
on measurement campaigns under artificial traffic conditions, conducted using terminals and/or specialised equipment (whose characteristics are not always equivalent to the commercial mobile radio terminals utilised by users), with obvious deficiencies from the viewpoint of flexibility and accuracy, and with high costs, due to the continuous employment of specialised personnel and to the additional generated traffic (see for example US Patent Applications U.S. 2001/0041566, U.S. 2002/0077786, U.S. 2002/0015398 and also WO-A-01/72058); and/or on QoS control techniques implemented through the dynamic management of network resources, able to be adapted to the requirements of the requested service or services, as described for example in US Patent Applications U.S. 2002/0141446, U.S. 2003/0112766 and U.S. 2002/0181394).

Examining in detail some recent contributions on this subject, the U.S. Pat. No. 6,434,364 describes a communication system that supports mobile test software agents (MTSA). The applicant observes that this system, in addition to being based only on the GSM network, has several limitations linked to measurement types and to measurable parameters. In particular, it is impossible to obtain qualitative parameters of the application session (delays, jitter, losses . . . ), or performance parameters referred to the operating conditions of the session (link throughput, CPU and memory utilisation level, terminal buffer congestion). The system does not provide for quality measurements on the application session, but only performance measurements on the radio channel at the low transport layers. The whole operation of the monitoring system is integrated in the functionalities of the network, i.e. it uses all normal functionalities of mobile radio networks. This entails problems with using the platform in multi-standard environments. Moreover, this system is incapable of adapting to the load conditions of the network and of the terminal.

One can also mention the commercial product QualiPoc of the company SwissQual AG, Zuchwill CH: this is a system that operates only in artificial traffic in which terminal configuration is done manually, loading the monitoring software; it does not allow to configure the measurements made, or to configure measurement procedures. It does not monitor the terminal and/or network resources in use; the measurements are downloaded locally, with no chance to integrate the system with other monitoring platforms; it is only available for the MMS service.

AIMS AND SUMMARY OF THE PRESENT INVENTION

The object of the present invention is to solve the critical aspects of the solutions identified above.

According to the present invention, said object is achieved thanks to an architecture for monitoring quality of service having the characteristics specifically described in the claims that follow. The invention also pertains to the related network, a corresponding method and a computer product able to be loaded into the memory of at least an electronic computer and comprising portions of software code for implementing the architecture and/or the method according to the invention when the product is executed on an electronic computer. Reference to an electronic computer is clearly destined to highlight the possibility of implementing the solution according to the invention at a decentralised level.

The currently preferred embodiment of the invention thus allows to obtain an architecture for monitoring Quality of Service (QoS) in a telecommunication network comprising a set of terminals. The terminals of the aforesaid set house measuring agents which can be configured to interface with processes selected among processes for managing the application sessions of said network and processes for measuring the operating conditions of the network itself. Also provided is a management and configuration sub-system comprising a module for scheduling Quality of Service measuring campaigns, capable of involving respective sub-sets of terminals according to a set of characteristics identifying the measuring campaign. The scheduling module is able to configure, for the purposes of the execution of the aforesaid measuring campaigns, the measuring agents housed by the terminals included in said related sub-sets according to said set of identifying characteristics.

Advantageously, an additional subsystem for managing the collection of the measurement data is also provided, preferably comprising a database for storing the measurement data and a processing centre for processing the data itself.

In the currently preferred embodiment, the solution described herein overcomes the critical issues intrinsically linked to the solutions identified above with particular reference to one or more of the following operating aspects:

- types of measures which can be conducted (qualitative, performance-related),
- type of measurement (artificial traffic, real traffic),
- possibility of conducting measurements by means of software agents with no need for ad hoc hardware,
- ability to remotely configure the measurements dynamically,
- ability to choose the terminals, with remotely programmable and schedulable activation of the measurements,
- modes of transporting configuration commands and data: for instance, SMS, TCP/IP, UDP etc. directly using the radio channel,
- measurable parameters: quality (delay, jitter, losses at the session level), performance-related (delay, throughput, losses at the transport level), parameters characterising terminal and network operating conditions,
- location of the physical point of measure (terminal, PC, system, node),
- location of the logic point of measure (protocol layer): e.g. low layers (physical, link),
- location of the terminal during the measurement,
- depth of the measurement (end-to-end and on individual call for an individual user),
- ability to perform quality measurements in the point nearest the user and on the application (for example, in the case audio-video-data multimedia service, it is possible to perform differentiated quality measures for individual media and for correlation between them, for instance measurements of synchronisation between audio and video),
- modes of transporting and collecting the measurement results: "report result message" (for example, transported on a normal radio channel),
- adaptability of the characteristics of the measurement to the type and number of the sample of terminals which can be activated,
- adaptability of processing, management, collection of the measurements to the operating conditions of the terminal and of the network,
- independence from the operating contexts deriving from the type of network (for instance mobile radio), from the type of service, from the type of terminal and from the specific network functionality (handshake, roaming, location, etc.),
- ease of extension to new services/applications,
- flexibility (independence from type, resources, technologies used in the link),
- stability (in case of changes/evolutions in the network),
- ease of interfacing with other performance measuring/monitoring systems,
- security/reliability of measurement data,
- partitioning of homogeneous performance/quality measurements on the link, and
- ability to correlate quality and transport performance measurements.

The system described herein can be configured in such a way as to assure the functionalities described above in simultaneous and co-ordinated fashion, although a subset of such functionalities can be implemented, without thereby departing from the scope of the invention described herein.

In general, the invention, in addition to allowing an integrated, detailed and accurate vision of the quality levels, can allow both to relate the quality levels to the operating conditions in which said quality levels have been reached, and to correlate quality and performance parameters (e.g. between levels of quality/power of the radio channel and dropped communications).

The system, which is scaleable and modular, excellently meets the requirements of security and reliability of the measured data, functional and performance transparency (i.e., non intrusive nature) with respect to the terminal and the user and economic transparency with respect to the service to be measured.

BRIEF DESCRIPTION OF THE ACCOMPANYING DRAWINGS

The invention shall now be described, purely by way of non limiting example, with reference to the accompanying drawings, in which.

DETAILED DESCRIPTION OF EMBODIMENTS OF THE INVENTION

Figure 1:
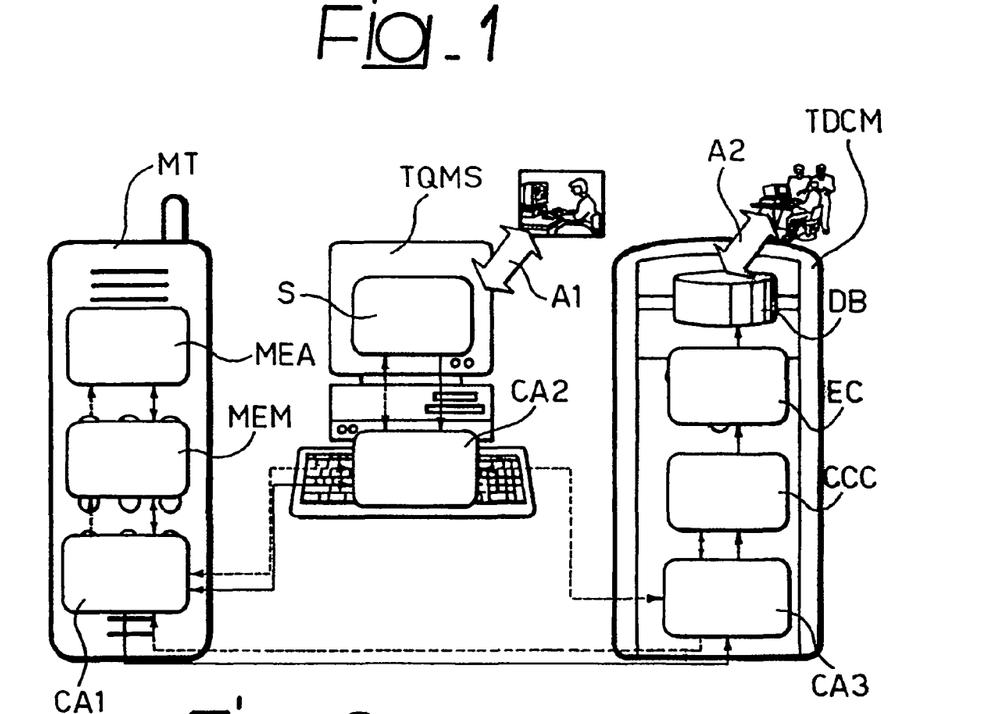
FIG. 1 is a function block diagram illustrating the platform architecture described herein.

FIG. 1 shows the general architecture of the system described herein, highlighting the function modules which compose it and the location of the communication and measurement agents. Also indicated are the external interactions both from/to a user of the system and to external systems for the collection, analysis, reporting of the results.

Briefly, referring to the (preferred, but not imperative) application to a mobile communication network—according to any standard—at the mobile terminal MT level the following are provided:

a measuring agent MEA (Measurement Executor Agent),
a Measurement Elaboration Module (MEM), and
a Communication Agent CA1.

At the level of the management and configuration system, overseeing the measurements (indicated herein as TQMS, with reference to the typical role of the Terminal Quality Measurement Scheduler) are instead present:

a measurement campaign scheduler S,
a communication agent CA2, and
an interface A1 for interfacing with a user of the system.

At the subsystem level having the function of managing data collection (Terminal Data Collector Manager or TDCM), are present:

a database DB,
a processing centre EC,
a collection centre CC,
a communication agent CA3, and
an interface A2 for interfacing between the platform and any external systems.

The dialogue between the various architecture components described (it will be noted that the structure illustrated with reference to the mobile terminal TM is usually reproduced at the level of multiple mobile terminals—and virtually at the level of all the mobile terminals of the network) is assured by the communication agents CA1, CA2 and CA3.

The agent CA2 associated to the management and configuration subsystem TQMS usually performs the role of co-ordination node, although—especially for the exchange of measurement data—direct communication is provided between mobile terminals TM and the manager module TDCM (and, possibly, between mobile terminal and mobile terminal). In particular, in the diagram of FIG. 1 the data lines and the signalling lines are respectively represented with solid lines and with dashed lines.

The user is able to co-ordinate with the TQMS subsystem to obtain joint simultaneous measurements.

Although it is not explicitly indicated in the figure, the measurement functionalities implemented on the terminal are also usable on the application servers. The TQMS and TDCM subsystems are thus able to interact with the agents located on the servers.

The architecture described herein defines and implements a system for monitoring the end-to-end QoS at the application layer in which the elementary measurements are effected by means of agents located directly on the TM terminal (and on the application server), in a manner that is transparent to the user.

The present description is centred on wireless networks/services, simply because it is the most stringent environment in terms of requirements and resource availability, especially at the terminal level (in terms of CPU and memories) and at the link level, where channel throughput is limited by radio access. The system can easily be extended to services (fundamentally, data) which employ wireline networks or to services on mixed wireless and wireline links, with terminals, be they cellular phones or PCs, connected both in wireless and wireline fashion to the network.

The basic system can be developed to cover diversified uses of considerable interest both for the service provider and for the user.

The service provider can use the system to perform systematic measurements, to activate focused or troubleshooting measurements or measurements for verifying SLAs stipulated with the user. The system enables the service provider, above all by means of simultaneous measurements on the same samples of calls, to conduct both segmented analyses of contributors to degradation on the link (to ascribe the causes, for example, to the terminal rather than to the application server or to the network), and analyses of correlation between homogeneous parameters measured between different protocol levels (e.g. between transport level and application level).

If the user is enabled and authorised, (s)he is able to activate the measurements and to display, directly on the screen of the terminal of the management and configuration subsystem TQMS (through a GUI graphic interface) the quality levels obtained for the communication, or to conduct SLA verifications by a highlighted comparison with stipulated levels.

If the degradation contribution is located in the terminal (or in the application server), local diagnostic investigations are possible with ad hoc measurements which can be obtained through the system itself. All these measurements, together with others on the radio channel and location on the terminal, allow optimisation/reconfiguration operations, especially on the radio access system, or short/medium term cell re-planning.

The measurements can be performed both in real traffic on the communications activated by the user, and in artificial traffic driven from the network when the cell phone is in the idle state or the mobile radio terminal is not already performing the same type of service to be activated for the measurement. Measurements in real traffic can be activated also by the user for the ongoing communication. All measurements are configurable (among possible ones) by the network (remotely through the scheduler) or by the user (on the terminal).

The measuring agent MEA on the terminal TM interacts with the application process for carrying out the service, as well as with the processes for measuring the mobile radio channel used, and with the operating processes within the terminal itself. In this way, the following measurements can be performed:
    quality level of the service at the application layer (availability, accessibility, link drop, delay, loss, integrity of the information content, such as those set out in the specification 3GPP TS 23.207),
    power and quality of the radio channel (BER, interference . . . ) used,
    performance characteristics of the end-to-end connection (throughput),
    terminal status and location,
    the simultaneous operating conditions of the terminal (or of the server) (CPU usage, memory usage, buffer saturation, etc.).

The agents on the terminal, in addition to performing measurement interactions, also perform processing and storing functions (MEM agent) and communication functions (CA1 agent). These activities are performing minimising their impact both on the resources of the mobile terminal and of the network, in order to meet the non-intrusion requirement of the platform described herein.

Preferably, for the management/configuration of the services provided by the agents and communication between agents, Jade technology is used (Jade is JAVA Agent Development Framework, as described for example in "A communication Protocol for agent on hand held devices" AAMAS Jul. 15-16, 2002, Bologna, Italy), which allows the development of distributed peer-to-peer application developed in JAVA and compliant with the FIPA standard. The technology, usable both in fixed networks (JAVA J2EE and J2SE) and mobile networks (Personal Java and J2ME) and the related features (white pages, yellow pages) are used in agent management.

This choice is not binding for the operation of the platform described herein because Jade could be replaced by other agent communication middleware. Communication between the agents can use different transport techniques selectable according to the operating conditions noted (for example if it is not possible to set up a TCP/IP link on GPRS because it is unavailable, the platform can decide to use transport on SMS). Preferably, for the exchange of messages between agents, the TCP/IP or UDP/IP transports will be used. This capability can enable interactions between the modules of the platform even if, though electromagnetic coverage is present, the user is unable to access the service (for example in the case of UMTS network a user may not be able to access a high bit rate video streaming services and, simultaneously, the agents on the terminal can, selecting an appropriate transport, send and receive data to and from the other modules of the platform).

The scheduling and overall management policies of distributed Jade agents (anomaly detection and management, configurations and reconfigurations, measurement scheduling, etc. . . . ) are implemented by a central unit developed according to the work-flow paradigm. The general architecture of the platform described herein highlights the functional modules and the interactions between them. Hereinafter reference shall be made to an "abstract" entity called User which can be either a human operator or an external program, able to interact with the platform.

The functionalities of the function modules identified above are described in greater detail below.

Scheduler (TQMS)

The measurement campaign scheduler designated as S is tasked with defining measurement campaigns. For this purpose the user interacts with the scheduler (through the interface A1) defining the characteristics of the measurement campaign (the reference universe).

This operation comprises multiple steps:
    defining the fundamental characteristics of a measurement campaign, able to identify the terminals to be subjected to the campaign (users, agreed contractual profile, service, terminal, spatial elements),
    defining the measurements to be made and the QoS indices to be obtained (compatible with the fundamental characteristics),
    defining the characteristics of the measurements to be made (measurement frequency, mode of sending the measurements to the collection centre), and
    defining the contextual information, associated to the measurements, that the peripheral agents will have to send together with the values of the measurements (type of measurement, information on the status of the terminal and of the network, . . . ).

To identify the involved terminals and activate the measurements the scheduler identifies potential terminals involved in the defined measurement campaign, proceeding to activate them. During the initial step, mechanism preferably intervenes to optimise the final transmission of the information to the TDCM in "a single shot": a method which can be used to optimise communications is DB sharing, where the scheduler stores the information about the involved terminals, their status and the measurement profiles loaded on the terminal.

The operation of identifying the terminals and activating the measurements comprises the following steps:
    the continuous search for the terminals that correspond to the fundamental characteristics, throughout the duration of the campaign,
    for each identified terminal, the scheduler S:
        records the terminal on internal data base (signalling to the user),
        creates the measurement profile with all information for managing, carrying out, processing and sending the measurements by the peripheral agent,
        transfers the measurement profile created by the peripheral agent (if the peripheral agent does not have a valid one, sent previously),
        activates the campaign on the terminal,
        sends information on the involved terminal and the list of the expected measurements to the TDCM subsystem, together with the parameters of the elementary campaign;
    identifying the terminals that undergo changes to the fundamental characteristics required by the campaign, making them non conforming therewith. For these terminals, the scheduler:

deactivates the campaign on the terminals,
decides whether or not to delete the measurement profile of the terminal,
informs the TDCM subsystem.

To identify the end of a measurement campaign, the scheduler S identifies for instance the expiration of a time-out). When this event takes place, for each terminal that was involved in the campaign, the scheduler S:

deactivates the campaign on the terminals,
decides whether or not to delete the measurement profile of the terminal,
informs the TDCM manager of the end of the measurement campaign.

The A1 interface represents the communication element towards the other external systems for the configuration and synchronisation of the measurement campaign, in particular to detect configuration commands from the exterior and communicate the updated information on the status of the campaign.

The interface preferably has available the functionalities to:
define a measurement campaign,
configure a measurement campaign,
command the activation of a measurement campaign,
monitor the status of a measurement campaign, and
managing the time synchronisation of a measurement campaign.

The main functionalities of the communication agent CA1 associated with the terminals TM are:
detecting the configuration commands by the scheduler S,
regularly informing the scheduler S of its own status (operating environment of the agent),
interacting with the other terminals,
activating the measurements processing agent MEM,
receiving the data from the measurements processing agent MEM,
sending the data to the collection centre CCC,
receiving software from the TQMS subsystem during the configuration step (for example software relating to the MEM and/or MEA agents).

The main functionalities of the subsystem constituting the MEM agent are:
detecting configuration commands by the scheduler (through the communication agent),
recognising the network/terminal status and "adapting" the way the measurements are conducted,
conducting measurements at regular intervals on:
the load state of the terminal TM and/or of the network,
the radio resources used by the terminal TM for the activated services,
location information,
being able to adapt the processing, aggregation and/or transmission of the measurements based on the network/terminal state acting on parameters such as, for instance:
measurement times,
measurement aggregation,
measurement processing algorithms,
transmission time and procedure;
informing the scheduler S (at regular intervals) of state/position, and
signalling any malfunction events.

The subsystems constituting the measuring agent MEA carries out the measurements and therefore must be configured, on each occasion, according to the requirements of the campaign. To maximise flexibility, this portion of code can be completely or partially transferred, from the scheduler, to the terminal.

The main functionalities of this subsystem, once it is configured, are:
detecting and recording the contextual data of the measurement,
obtaining the mobile radio system measurements (this depends on the terminal) such as:
radio system measurements and/or events of the terminal like power, radio quality, handover;
obtaining terminal state measurements, such as:
detecting that the terminal has been turned on,
battery level,
CPU usage level,
memory usage level,
etc. . . .

Note that the peripheral measurement agents MEA, to conduct service measurements, must detect events of the service of interest (e.g. opening a session, requesting and receiving data, etc.).

In alternative embodiments, the peripheral agents MEA and MEM can also be located on the application servers (servers involved in the provision of the service) for the various types of services.

They can also be located on a certain number of terminals having different performance characteristics and/or they can interact directly with each other to implement functions to be analysed (e.g. the terminals which are within the same cell could co-ordinate with each other to transmit the measurements to the collection centre, avoiding the simultaneous use of the radio resources).

Preferably, each peripheral agent interfaces with:
the operating system of the terminal,
the application through which the user accesses the service,
the communication software (both at the application level and at the network level),
the software which is stored on the SimCards and, possibly, with their operating system.

Typically, a peripheral agent of the platform interacts with other processes through API interfaces (Application Programming Interface) which can be:
standard of the programming language used (in the example described herein, Java),
specific of the platform used to manage the processes of the platform and for communication between the peripheral and the centralised agents,
specifications of the operating system of the terminal (e.g. Symbian), The API interfaces for interfacing with the applications (for example for interfacing with other environments such as JavaPhone, JavaCard etc.) are preferably accessible by the peripheral agents through a general API which uncouples the development of the peripheral agents from the operating and development environment.

The functionalities of the TDCM subsystem result from those of its constituting elements, as described below.

In particular, the collecting centre CCC:
collects the measurement data arriving from the different terminals,
receives the records sent by the terminals,
verifies semantic correctness (any errors introduced by the transport, missing measurement, partial measurement), and:
in case of errors requests the terminal TM to retransmit the measurement (with error management function, possibly providing for the storage, for a certain period on the terminal, of the measurements made in order to retransmit them later), if no errors are found, it sends the measurement data to the processing centre EC.

The latter, when preparing the start of the measurement campaign, receives the configuration commands from the scheduler S. In this way the manager TDCM knows:

the characteristics of the measurement campaign itself (limit duration, types of measurements, services, etc.), i.e. of the reference universe, the list of potential terminals involved in the campaign, and updates on the status of potential terminals.

During the processing step, the centre EC reads the context data of each measurement arriving from the collection centre in order to:

associate them to the measurement campaign and to verify their actual ability to be associated to the reference universe adopted by the measurement campaign itself, recognise and check the sequential (time-related) order of the records, possibly recognise the last elementary measurement for that campaign, send a notification to the user when one of the following events takes place:

updating of the number of measurements sent by each involved terminal, any errors detected on the peripheral agents (e.g. the expiration of a time-out regarding the recording of an event by the peripheral agent), recognise the end of the measurement campaign (in a manner synchronised with the scheduler S).

At the conclusion of a measurement campaign the TDCM manager subsystem applies a criteria to accept or reject the received measurements (for example those received after the logic conclusion of the campaign and pertaining to events started before the conclusion, or those that are still incomplete, . . . ), processing the correct records with the procedures prescribed by the campaign itself and storing them in the database DB.

Moreover, the manager TDCM stores the results and the reports on a database that is logically different from the one used to store the elementary measurements because time persistence may be different.

The types of interaction between the modules of the platform described above can be classified according to at least two different criteria:

use of the resources of the mobile radio system: this criterion aims to differentiate the interactions between processes depending on the use of the resources of the mobile radio network because they must be subject to different performance requirements, functional criterion: this criterion aims to highlight the differences between the "signalling" relationships between various entities of the platform and those which exchange data.

For the interactions that pertain to the processes of the platform described herein, two other types of interactions should also be specified:

a "horizontal" type of interaction which groups all the interactions between processes of the platform; these can, in turn, be subdivided into two classes:

communication interaction: the interaction between two or more agents of the platform when they must exchange data (measurements, quality indicators, etc.), management interaction: the interaction between two or more agents of the platform when they must exchange configuration data or when they must perform management procedures (activation, cancellation, agent downloading);

a "vertical" type of interaction which groups all possible interactions between the processes of the platform and external processes such as the terminal operating system, the applications, the communication protocols, the data base management systems (DBMS), etc.

Figure 2:
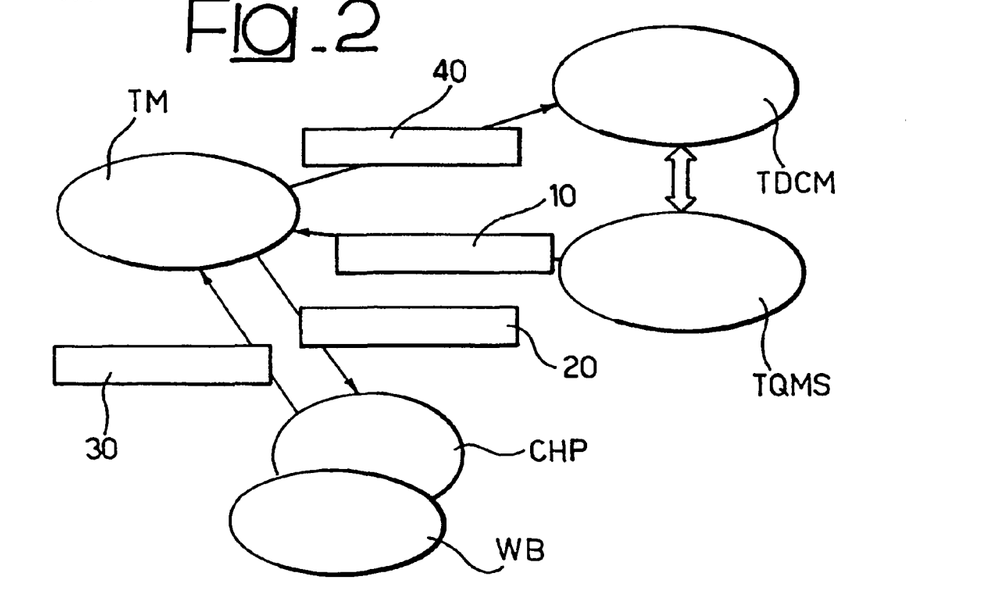
FIG. 2 is a diagram illustrating the flow of the interactions for use of the aforesaid platform.

In this regard, the functional diagram of FIG. 2 highlights the following types of interaction:

configuration of the platform in view of a measurement campaign: this interaction, designated by the number 10, is typically a horizontal signalling interaction of the TQMS subsystem (more specifically, the scheduler S) to the peripheral agents housed on the mobile terminals TM, any request for measurement data from the peripheral agents (MEM in FIG. 1) to a MEA type entity: this interaction, designated as 20 is typically a vertical signalling interaction which involves, for example, an HTTP client process, designated as CHP, with the aid of a web browser WB, provision of the measurement data requested as a result of the interaction that has just been described: this interaction, designated as 30, is typically a vertical interaction of data transmission from the agent MEA to the agent MEM, and transmission of the measurement data from the peripheral agents to the measurement collection subsystem TDCM (and to the management and configuration subsystem TQMS which co-operates with it): this interaction, designated as 40, is typically a horizontal measurement interaction.

A more detailed description follows of the fundamental operative steps for the use of the platform described herein which involve the normal functionalities of the various elements constituting the platform itself; specifically, a description will be provided of all possible cases of interaction between the platform elements referred to the design and development specifications of a practical implementation by the Applicant.

Figure 3:
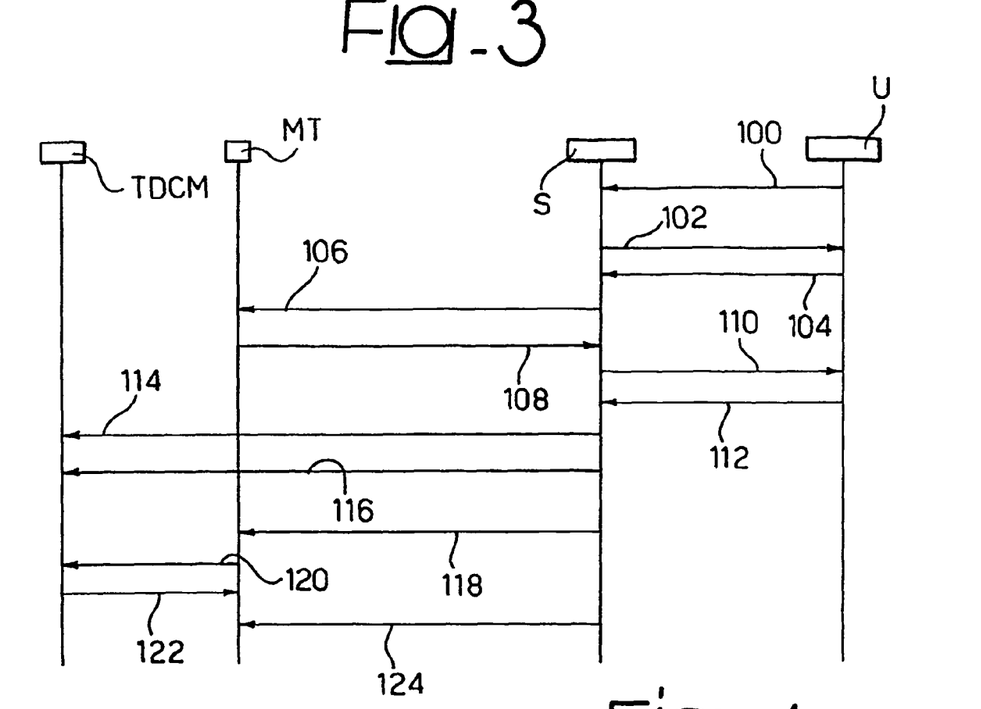
FIG. 3 is a diagram illustrating the functional steps of activating and executing a measure at a peripheral agent with subsequent downloading of the measurement into a collection centre within the platform of FIG. 1.

The description of the steps refers to the diagram of FIG. 3 and applies to a context of measurement campaign performed by the platform itself through the interaction with an abstract entity called user. The user may be a person, an external process, an organisational entity or another element. It is evident that when the subject changes the implementations of the interface will change, but not the semantic aspects of the inter-relationships.

In the example reproduced herein, it is assumed that the platform is interested in the following operations:

upon a user's subscription, the terminal is configured incorporating the communication agent and this action will make the terminals known to the platform itself by means of an identifier and correlated information; this information will be used to identify and locate the terminals;

the user U interacts (step 100 of FIG. 3) with the scheduler S defining the characteristics of the measurement campaign (the reference universe—whose status is notified to the user in a step 102); these characteristics may derive from planned systematic activities, from specific, internal monitoring requirements (e.g. customer base segments of particular interest), or troubleshooting requirements of the network (e.g. when complaints are received); moreover, co-ordinated, synchronised measurement campaigns can be planned on homogeneous sets of quality parameters, to allow:
  correlations between objective network and service measurements on the same set of calls,
  correlations between objective service measurements and subjective measures derived from surveys;
the scheduler identifies the potential terminals involved in the measurement campaign; the result of this operation must be notified to the user who will have to decide whether to continue with the process and to express his consent in a step 104; in case of extensive and systematic campaigns involving a high number of terminals, it could become necessary to have an interface with the databases of the mobile radio network, to identify and locate the set of terminals potentially involved in the measurement;
the scheduler creates the measurement profiles (comprising information about the procedures for individual measurements and about the type of measurement and the inter-relationships between the measurements) suitable for each terminal involved in the measurement campaign; to the measurement profile is associated a criterion for timing the transmission of the measurements, to avoid any network overloads;
in a step 106, to each identified terminal is transferred the respective measurement profile (this procedure is noted by the peripheral agent—if active—in a step 108); the outcome of the operation is notified in a step 110 to the user: the user can then decide actually to carry out the measurement campaign (being able to choose whether to carry out the campaign only on those active at the start or also on potential ones—with the possible management of ongoing communications);
in case of consent by the user (expressed in a step 112) the scheduler automatically starts the measurement campaign on the configured terminals through a multicast command (when possible, the synchronisation function between the scheduler, the peripheral agents and the TDCM, provided by the GPS system, could be used), also preparing the list of potentially involved terminals and the list of measurements expected from each of them, and sending this information—in steps designated as 114 and 116 in FIG. 3—to the TDCM subsystem together with the parameters of the elementary campaign;
during the measurement campaign, the scheduler S keeps track of the terminals potentially involved in the campaign; this information is used:
  to activate and/or reactivate the campaign on the terminals which will be activated late with respect to the start of the campaign,
  to suspend or deactivate the campaign on the terminals that, during the interval of the campaign itself, undergo changes to the parameters and/or the fundamental characteristics,
  when processing the measurements, at the end of the campaign, to highlight any inconsistencies of the collected data relative to the scheduled data (measurements not carried out, partial, suspended due to terminal unavailability or overload, with errors; failed reception or integrity problems in the collection);
upon the activation, by the scheduler S, of the measurement campaign (step 118), the peripheral agents start the prescribed measurements compatibly with the availability and/or load status of the terminal and of the network;
the peripheral agents store and pre-process the measurements locally to the terminal: this activity is set up in adaptive fashion by the peripheral agent according to the measurement profile and to the performance of the terminal and of the network;
the peripheral agent sends to the TDCM subsystem (in a step 120) information records which comprise, in addition to the elementary measurements and/or to the calculated parameters, also context and operational data associated to the measurements;
the TDCM subsystem receives the records sent by the terminals and verifies their correctness (detecting any errors introduced by the transport, missing measurement, partial measurement), feeding back to the terminals in a step 122; in addition to confirming the reception (ACK) the feedback can bring the TDCM subsystem to request the terminal, in case of error, to retransmit the measurement (there must be provisions for the error management function must be provided for, possibly providing for the storage, for a certain period on the terminal, of the measurements made in order to retransmit them later);
the TDCM subsystem knows the list of potential terminals involved in the campaign, and the characteristics of the measurement campaign itself (the limit duration, the types of measurement, the services, etc.), i.e. of the reference universe, and it reads the context data of each measurement in order to:
  verify whether they can actually be associated to the reference universe adopted by the measurement campaign and, if so, it stores the elementary measurement and context data in the collecting DBs,
  recognise and check the sequential (time-related) order of the records, and the last elementary measurement for that campaign,
  send a notification to the user when one of the following events occurs:
    update the number of measurements sent by each involved terminal,
    any errors detected on the peripheral agents (e.g. the expiration of a time-out pertaining to the recording of an event by the peripheral agent),
    of the measurement campaign;
at the conclusion of the measurement campaign, the TDCM applies a criterion to decide whether or not to accept the measurements received after the logical conclusion of the campaign pertaining to events which started before its conclusion;
at the conclusion of a campaign, in a step 124 the TDCM subsystem (measurements processor) deactivates the measuring agents, processes the records corrected in the manners provided by the campaign itself, computes the quality indices and stores them in a DB that is logically different from that of the elementary measurements, since time persistence may be different;
the normal user of the platform is able to conduct specific queries on the DBs produced (on the overall set of the data from the various campaigns), filtering QoS "Views" and sending the various report types to the interested corporate levels;
other users (e.g. belonging to the network area), with authorised access profiles, can access the DBs of the Platform, with specific queries to filter data for correlation analysis and/or troubleshooting purposes (in this case, for more timely access, it will be necessary to provide dedicated areas on the collection data base where the results of the elementary measurements can be stored).

Figure 4:
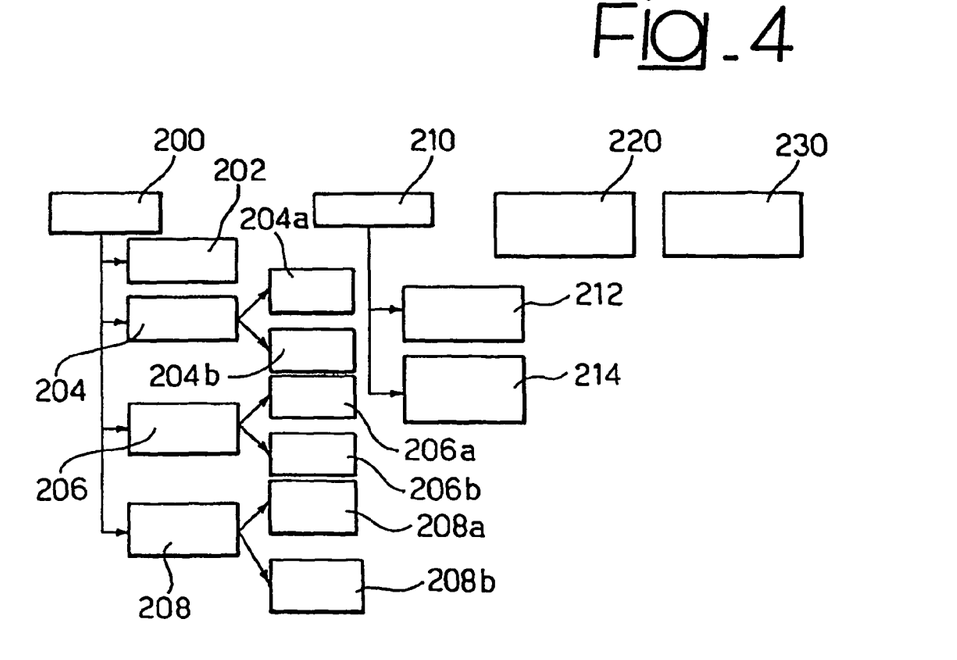
FIG. 4 is yet another functional block diagram showing the possible types of use of the platform described herein, seen from the terminal side.

The diagram of FIG. 4 exemplifies some possible cases of use of the described platform.

The QoS measurements thus obtained can be used by a mobile radio operator for different goals, for purposes of improvement in relation to internal processes and support systems, e.g. use of the system can be focused on the performance of the terminal under load to optimise its configuration or on communication quality or to perform troubleshooting analysis, and the user can be given the ability to control the functional and operational processes of the service of interest to him, e.g. to verify stipulated SLAs.

The platform usage scenarios specifically identified herein relate firstly to Quality of Service monitoring, designated 200 in the diagram of FIG. 4. This set of functions typically comprises:

measurements 202 carried out by the terminal (for instance, evaluation of the quality of the radio connection), also in consideration of data stored on the SIM, evaluations 204 of end-to-end performance (terminal side or server side), both operator driven (204a) and user driven (204b), evaluations 206 of the performance of the terminal/server, also both operator driven (206a) and user driven (206b), verification 208 of SLA agreement at the terminal and service provider level, also both operator driven (208a) and user driven (208b).

The platform can also be used for troubleshooting functions, i.e. to identify possible causes of QoS degradation within the terminal.

This set of function, globally designated as 210, essentially comprises diagnostics and malfunction notification (terminal side, application server side) and real time configuration and management of resources (also terminal side and application server side).

The diagram of FIG. 4 expressly indicates that said functions can be decided both by the operator (block 212) and by the user (block 214).

In the diagram of FIG. 4, the blocks 220 and 230 indicate the possible application of the platform to diagnose the internal resources and functionalities of the terminal and the optimised configuration and management of resources (e.g. in real time) in a Quality of Service (QoS) perspective.

Briefly, the platform architecture described herein provides the ability to:

measure, simultaneously and globally in mobile radio environment in objective fashion and on a call-by-call basis, quality parameters and operating conditions of the link in the point of access to the service that is closest to the user's perception (hence on the terminal and at application level), measure not only the quality parameters of the session (availability, accessibility, link maintenance, delays, errors, losses on information contents), but also simultaneously to detect the operating conditions of the radio channel (power, BER etc.), of the link (throughput), of the terminal (CPU load, buffer and memory usage . . . ), in which it was obtained, associate terminal location data to the measure, segmenting quality degradation between network/terminal/application server, transparently conducting, on the user terminal, measurements either in real traffic on the ongoing communication, or activating measurements in artificial traffic, dynamically managing (also remotely) both the terminals on which the measurement is to be conducted, and the profile of the measurements (parameters, measurement procedures), conduct measurements both driven by the service provider and by the user, automatically manage the procedures for downloading, processing and locally storing the measurements (on the terminal), according to the processing load of the terminal and of the radio channels, achieving platform independence from network technology, choosing the most suitable transport mode, among available ones (the one that will minimise impact on network load) for the communications between the platform agents.

The platform described herein is suitable to monitor QoS also in advanced multi-standard environments (for example UMTS/W-LAN) in which a multi-mode intelligent terminal is able simultaneously to use multiple access systems for transporting information (communication formed by multiple parallel links on multiple radio systems).

The platform described herein for monitoring end-to-end QoS for services supported by mobile radio terminals can also be used by means of an ad-hoc development of the APIs (Application Program Interface) interfacing with the operating and development environment to fixed networks (LAN, MAN and WAN) and to wireless networks (W-LAN). Moreover, the platform can operate in multi-standard environments on multi-mode terminals.

In the currently preferred embodiment, the solution described herein provides a platform for monitoring QoS (both in real traffic and in artificial traffic) that is applicable to all services, to all mobile radio networks (GSM/GPRS/UMTS/EDGE) and to all mobile radio terminals (characterised by different operating environments, performance and interfaces): the architecture is based on measuring agents located on the mobile terminals, able to interface, with appropriate APIs, with the processes for managing the application session, measuring radio reception conditions, status and operating condition (load, terminal location, etc.) and to dialogue with other measuring or management agents. These agents can be remotely and flexibly managed on the terminals according to measurement scheduling (they can be loaded, activated, configured dynamically on a predetermined set of mobile radio terminals).

They are also able:

To carry out co-ordinated measurements (according to configurable measurement profiles).

To carry out local storage/pre-processing operations as a function of operating conditions (e.g. load on the radio channels for transmitting the measurements, re-transmission requests from the collection centre).

To manage the transfer of the measurement results to a collection centre in programmable fashion.

Through this architecture it is possible to carry out conventional operations (on the user terminal), such as:

obtaining typical measurements of the quality and of the operating conditions of the radio access (transmitted or received power, BER, etc. . . . ), monitoring end-to-end transport performance (both in real traffic and in artificial traffic), measurements and processing (on the mobile radio terminals) for the production of QoS indicators at the end-to-end application layer, and hence very close to the quality perceived by the users, which depend both on the type of service and on the service step of interest, such as: availability, accessibility, delays, jitter, losses, drops, etc.

monitoring the operating conditions of the resources of the terminal and network (throughput, CPU load and memories, buffer congestion, etc.).

Naturally, without altering the principle of the invention, the construction details and the embodiments may vary widely from what is described and illustrated herein, without thereby departing from the scope of the present invention, as defined in the appended claims.

The invention claimed is:

1. An architecture for monitoring quality of service in a telecommunication network comprising:
a set of mobile terminals, each mobile terminal of said set of mobile terminals housing at least one measuring agent configured to interface with processes for managing application sessions of said telecommunication network and processes executed by the mobile terminal for directly measuring operating conditions of said telecommunication network to derive therefrom a set of measurement data by the respective mobile terminal, wherein said at least one measuring agent is further configured to measure a load state of the mobile terminal and of the telecommunication network and to adapt processing, management and collection of the measurement data by the respective mobile terminal according to the load state measured; and
a management and configuration subsystem comprising a scheduling module for scheduling quality of service measuring campaigns, said scheduling module identifying a subset of said set of mobile terminals according to a set of identifying characteristics of a defined measuring campaign and configuring, for executing said defined measuring campaign at least one measuring agent housed by each mobile terminal of said subset according to said set of identifying characteristics,
wherein each mobile terminal of said set of mobile terminals comprises:
an elaboration agent configured to pre-process said set of measurement data derived from said application session; and
a communication agent configured to send said set of pre-processed measurement data to said management and configuration subsystem.

2. The architecture as claimed in claim 1, wherein an additional subsystem is provided for managing a collection of measurement data resulting from said defined measurement campaign, said additional subsystem comprising at least one of a database for storing said collection of measurement data and of a processing centre for processing said collection of measurement data.

3. The architecture as claimed in claim 1, wherein said at least one measuring agent housed by each mobile terminal of said set of mobile terminals is configured to dialogue with at least one homologous measurement and management agent.

4. The architecture as claimed in claim 2, wherein said at least one measuring agent housed by each mobile terminal of said subset is configured to perform operations selected from the group of:
conducting co-ordinated measurements on said telecommunication network,
performing local storage and pre-processing operations according to a set of processing conditions of said telecommunication network, and
managing a transfer of the collection of measurement data resulting from said defined measurement campaign to said additional subsystem.

5. The architecture as claimed in claim 1, wherein said at least one measuring agent housed by each mobile terminal of said subset is configured to conduct measurements selected from the group of:
measuring quality and operating conditions of a set of radio access parameters of said subset,
monitoring end-to-end transport performance in real traffic,
monitoring end-to-end transport performance in artificial traffic,
measuring and processing said subset to produce quality of service indicators at an application layer, and
monitoring operating conditions of a set of resources of said subset and of said telecommunication network.

6. The architecture as claimed in claim 1, wherein said management and configuration subsystem comprises at least one communication agent that interfaces with said communication agent associated with said at least one measuring agent housed by each mobile terminal of said set of mobile terminals.

7. The architecture as claimed in claim 2, wherein said management and configuration subsystem comprises at least one communication agent that interfaces with at least one homologous communication agent associated with said additional subsystem.

8. The architecture as claimed in claim 1, wherein said management and configuration subsystem comprises an interface for interfacing with a user.

9. The architecture as claimed in claim 2, wherein said additional subsystem comprises a communication agent configured to communicate with at least one communication agent associated with said at least one measuring agent housed by each mobile terminal of said set of mobile terminals.

10. The architecture as claimed in claim 2, wherein said additional subsystem comprises an interface for interfacing said architecture with at least one external system.

11. The architecture as claimed in claim 2, wherein said at least one measuring agent housed by each mobile terminal of said subset is configured to transfer said collection of measurement data to said additional subsystem.

12. The architecture as claimed in claim 1, wherein said at least one measuring agent housed by each mobile terminal of said set of mobile terminals operates according to Jade technology.

13. The architecture as claimed in claim 3, wherein said at least one measuring agent housed by each mobile terminal of said subset dialogue with said at least one homologous measurement and management agent with a communication resource selected from the group of:
information transport by means of SMS,
TCP/IP transport, and
UDP/IP transport.

14. The architecture as claimed in claim 1, wherein said scheduling module is configured to perform at least one operation selected from the group of:
defining the set of identifying characteristics of the defined measuring campaign,
identifying the subset of said set of mobile terminals to be subjected to said measuring campaign,
defining a set of measurements to be made and a set of quality of service indicators to be obtained,
defining a set of characteristics of the set measurements to be made, and
defining a set of contextual information associated with the set of measurements to be made and carried out by said at least one measuring agent housed by each mobile terminal of said subset.

15. The architecture as claimed in claim 1, wherein, in order to identify said subset of said set of mobile terminals, said scheduling module is configured to carry out operations selected from the group of:
- continuously searching for the subset of said set of mobile terminals meeting the set of identifying characteristics of the defined measuring campaign,
- recording said subset of said set of mobile terminals on an internal database,
- creating a measurement profile with information for conducting a set of measurements by the at least one measuring agent housed by each mobile terminal of said subset of said set of mobile terminals,
- activating the defined campaign on each mobile terminal of said subset of said set of mobile terminals,
- sending the set of measurements collected from each mobile terminal of said subset of said set of mobile terminals,
- identifying at least one mobile terminal that no longer meets the set of identifying characteristics of the defined measuring campaign,
- deactivating the defined measuring campaign, and
- deleting the measurement profiles from said each mobile terminal of said subset of said set of mobile terminals.

16. A method for monitoring quality of service in a telecommunication network comprising a set of mobile terminals comprising:
- associating each mobile terminal of said set of mobile terminals with at least one measuring agent configured to interface with processes for managing application sessions of said telecommunication network and processes executed by the mobile terminal for directly measuring operating conditions of said telecommunication network to derive therefrom a set of measurement data by the respective mobile terminal,
- wherein said at least one measuring agent is further configured to measure a load state of the mobile terminal and of the telecommunication network and to adapt processing, management and collection of the measurement data by the respective mobile terminal according to the load state measured, wherein the mobile terminals comprise:
  - an elaboration agent configured to pre-process said set of measurement data derived from said application session; and
  - a communication agent configured to send said set of pre-processed measurement data to said management and configuration subsystem, and
- conducting quality of service measuring campaigns, each quality of service measuring campaign involving a subset of said set of mobile terminals according to a set of identifying characteristics of a defined measuring campaign and configuring, for executing said defined measuring campaign, at least one measuring agent associated with each mobile terminal of said subset according to said set of identifying characteristics.

17. The method as claimed in claim 16, comprising managing a collection of measurement data and providing at least one of a database for storing said collection of measurement data and a processing centre for processing said collection of measurement data.

18. The method as claimed in claim 16, comprising configuring said at least one measuring agent associated with each mobile terminal of said set of mobile terminals to dialogue with at least one homologous measurement and management agent.

19. The method as claimed in claim 16, comprising configuring said at least one measuring agent associated with each mobile terminal of said subset to perform steps selected from the group of:
- conducting co-ordinated measurements on said telecommunication network,
- performing local storage and pre-processing operations according to a set of processing conditions of said telecommunication network, and
- managing a transfer of a collection of measurement data resulting from conducting the defined measuring campaign to an additional sub-system for managing the collection of the measurement data.

20. The method as claimed in claim 16, comprising configuring said at least one measuring agent associated with each mobile terminal of said subset to conduct measurements selected from the group of:
- measuring quality and operating conditions of a set of radio access parameters of said subset,
- monitoring end-to-end transport performance in real traffic,
- monitoring end-to-end transport performance in artificial traffic,
- measuring and processing on said subset for the production of quality of service indicators at an application layer, and
- monitoring operating conditions of a set of resources of said subset and of said telecommunication network.

21. The method as claimed in claim 16, comprising:
- measuring, by means of said at least one measuring agent associated with each mobile terminal of said subset, a load state of at least one mobile terminal of said subset and/or of said telecommunication network, and
- adapting a monitoring of quality of service in said telecommunication network to the measured load state.

22. The method as claimed in claim 16, comprising providing a sub-system for the management and configuration of the quality of service measurement campaigns that interfaces with said at least one measuring agent associated with each mobile terminal of said set of mobile terminals.

23. The method as claimed in claim 17, comprising:
- providing a sub-system for the management and configuration of the quality of service measurement campaigns, and
- providing an additional sub-system for managing the collection of measurement data that interfaces with said sub-system for the management and configuration of the quality of service measurement campaigns.

24. The method as claimed in claim 16, comprising providing a sub-system for the management and configuration of the quality of service measurement campaigns that interfaces with a user.

25. The method as claimed in claim 17, comprising providing an additional sub-system for managing the collection of measurement data configured to communicate with said at least one measuring agent associated with each mobile terminal of said set of mobile terminals.

26. The method as claimed in claim 17, comprising providing an additional sub-system for managing the collection of measurement data configured to interface with at least one external system.

27. The method as claimed in claim 17, comprising:
- providing an additional sub-system for managing the collection of measurement data, and configuring said at least one measuring agent associated with each mobile terminal of said subset to transfer said collection of measurement data to said additional subsystem.

28. The method as claimed in claim 16, wherein said at least one measuring agent associated with each mobile terminal of said set of mobile terminals operates according to Jade technology.

29. The method as claimed in claim 18, comprising configuring said at least one measuring agent associated with each mobile terminal of said set of mobile terminals for dialoguing with said homologous measurement and management agent with a communication resource selected from the group of
information transport by means of SMS,
TCP/IP transport, and
UDP/IP transport.

30. The method as claimed in claim 16, wherein conducting said quality of service measurement campaigns in turn comprises at least a step selected from the group of:
defining the set of identifying characteristics of the defined measuring campaign,
identifying the subset of said set of mobile terminals to be subjected to said defined measuring campaign,
defining a set of measurements to be made and a set of quality of service indicators to be obtained,
defining a set of characteristics of said set of measurements to be made, and
defining a set of contextual information associated with said set of measurements to be made and carried out by said at least one measuring agent associated with each mobile terminal of said subset.

31. The method as claimed in claim 16, further comprising, in order to identify said subset of said set of mobile terminals, the steps selected from the group of:
continuously searching for the subset of said set of mobile terminals meeting the set of identifying characteristics of the defined measuring campaign,
recording said subset of said set of mobile terminals on an internal database,
creating a measurement profile with information for conducting a set of measurements by the at least one measuring agent associated with each mobile terminal of said subset,
activating the defined measuring campaign on each mobile terminal of said subset,
sending the set of measurements collected from each mobile terminal of said subset of said set of mobile terminals,
identifying at least one mobile terminal that no longer meets the set of identifying characteristics of the defined measuring campaign,
deactivating the defined measuring campaign, and
deleting the measurement profile from each mobile terminal of said subset of said set of mobile terminals.

32. A telecommunication network comprising, the architecture as claimed in claim 1, and associated with the telecommunication network.

33. The telecommunication network as claimed in claim 32, comprising at least an application server housing at least one measuring agent that interacts with said architecture.

34. A non-transitory computer-readable medium storing a computer program product for execution on a processor, the computer program product comprising portions of software code for implementing the method as claimed in any one of claims 16-18 and 19-31.

* * * * *

UNITED STATES PATENT AND TRADEMARK OFFICE
CERTIFICATE OF CORRECTION

| | | |
|---|---|---|
| PATENT NO. | : 8,369,217 B2 | Page 1 of 1 |
| APPLICATION NO. | : 10/579293 | |
| DATED | : February 5, 2013 | |
| INVENTOR(S) | : Bostica et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 681 days.

Signed and Sealed this
Eighteenth Day of November, 2014

Michelle K. Lee
*Deputy Director of the United States Patent and Trademark Office*